United States Patent
Samvik et al.

(10) Patent No.: US 9,508,119 B2
(45) Date of Patent: Nov. 29, 2016

(54) APPLICATION OF FILTERS REQUIRING FACE DETECTION IN PICTURE EDITOR

(71) Applicant: BlackBerry Limited, Waterloo (CA)

(72) Inventors: Hans Rikard Samvik, Lund (SE); Nils Johan Petter Montan, Malmo (SE)

(73) Assignee: BlackBerry Limited, Waterloo, Ontario (CA)

( * ) Notice: Subject to any disclaimer, the term of this patent is extended or adjusted under 35 U.S.C. 154(b) by 6 days.

(21) Appl. No.: 14/490,985

(22) Filed: Sep. 19, 2014

(65) Prior Publication Data
US 2015/0002537 A1 Jan. 1, 2015

Related U.S. Application Data

(63) Continuation-in-part of application No. 13/548,391, filed on Jul. 13, 2012, now abandoned.

(51) Int. Cl.
*G06T 3/20* (2006.01)
*G06T 7/00* (2006.01)
*G06T 11/60* (2006.01)

(52) U.S. Cl.
CPC ............ *G06T 3/20* (2013.01); *G06T 7/0083* (2013.01); *G06T 11/60* (2013.01); *G06T 2207/20132* (2013.01); *G06T 2207/30201* (2013.01)

(58) Field of Classification Search
CPC ... G06T 2201/22; G06T 11/60; G06T 19/00; G06T 3/00; G06T 2219/2021; G06T 3/0006; G06T 3/60; G06T 3/602; G06T 3/606; G06T 3/608; G06T 3/20; G06T 7/00; G06T 3/40; G06T 5/10; G06T 2210/22; G06T 2207/30201; G06T 5/005; G06T 2207/20192; G06T 11/00; G06K 9/00281; G06K 9/00248; G06K 9/00221; G06K 9/00268; G06K 9/00295; H04N 1/62; H04N 5/23229; G06F 17/30247

USPC .......... 345/619, 623; 348/143–155; 382/118, 382/276, 293, 294, 173–180

See application file for complete search history.

(56) References Cited

U.S. PATENT DOCUMENTS

| | | | |
|---|---|---|---|
| 4,819,192 A * | 4/1989 | Kuragano | G06T 15/50 345/421 |
| 5,317,682 A * | 5/1994 | Luken, Jr. | 345/442 |
| 5,574,836 A * | 11/1996 | Broemmelsiek | 345/427 |
| 8,032,855 B1 * | 10/2011 | Ling et al. | 716/122 |
| 8,416,277 B2 * | 4/2013 | Yeh | 348/14.02 |
| 8,593,475 B2 * | 11/2013 | Smithers et al. | 345/582 |
| 2001/0044747 A1 * | 11/2001 | Ramachandran et al. | 705/16 |
| 2001/0055011 A1 * | 12/2001 | Terao et al. | 345/204 |
| 2002/0085000 A1 * | 7/2002 | Sullivan et al. | 345/422 |

(Continued)

*Primary Examiner* — Haixia Du
(74) *Attorney, Agent, or Firm* — Thomas S. Grzesik; Fleit Gibbons Gutman Bongini & Bianco P.L.

(57) ABSTRACT

An electronic device and method of operation, the electronic device including at least one processor communicatively coupled to a display and memory, the processor configured for filtering a facial image rendered on the display. In an illustrative embodiment, the at least one processor is configured to generate a boundary around the facial image, the boundary having 2-dimensional x and y coordinates relative to boundaries of the display; store the coordinates in memory; in response to at least one of a cropping and moving of the image, recalculate the coordinates to match a new transform setting; and apply an effect to the facial image based on the updated coordinates.

16 Claims, 4 Drawing Sheets

(56) References Cited

U.S. PATENT DOCUMENTS

| | | | |
|---|---|---|---|
| 2003/0169277 A1* | 9/2003 | Patton | 345/620 |
| 2004/0223063 A1* | 11/2004 | DeLuca et al. | 348/239 |
| 2005/0105806 A1* | 5/2005 | Nagaoka et al. | 382/224 |
| 2005/0122338 A1* | 6/2005 | Hong et al. | 345/546 |
| 2006/0045381 A1* | 3/2006 | Matsuo et al. | 382/276 |
| 2006/0047584 A1* | 3/2006 | Vaschillo | G06F 17/30277 705/26.62 |
| 2006/0204057 A1* | 9/2006 | Steinberg | 382/118 |
| 2006/0210264 A1* | 9/2006 | Saga | 396/287 |
| 2007/0273669 A1* | 11/2007 | Park et al. | 345/173 |
| 2008/0225155 A1* | 9/2008 | Ebato et al. | 348/333.05 |
| 2008/0260255 A1* | 10/2008 | Fukushima et al. | 382/190 |
| 2009/0023472 A1* | 1/2009 | Yoo et al. | 455/556.1 |
| 2009/0195555 A1* | 8/2009 | Nystad et al. | 345/620 |
| 2009/0316016 A1* | 12/2009 | Iwamoto | 348/222.1 |
| 2010/0194903 A1* | 8/2010 | Kawashima | 348/222.1 |
| 2010/0220175 A1* | 9/2010 | Claydon | H04N 9/8715 348/43 |
| 2010/0296583 A1* | 11/2010 | Li | 375/240.24 |
| 2010/0299621 A1* | 11/2010 | Piehler et al. | 715/764 |
| 2011/0074824 A1* | 3/2011 | Srinivasan et al. | 345/660 |
| 2011/0074928 A1* | 3/2011 | Misawa | 348/47 |
| 2011/0158537 A1* | 6/2011 | Uno | 382/190 |
| 2011/0234503 A1* | 9/2011 | Fitzmaurice et al. | 345/173 |
| 2011/0286644 A1* | 11/2011 | Kislal | 382/128 |
| 2012/0154545 A1* | 6/2012 | Choi | G06T 7/0042 348/47 |
| 2012/0200572 A1* | 8/2012 | Kaechi | 345/442 |
| 2012/0200729 A1* | 8/2012 | Hoda et al. | 348/222.1 |
| 2012/0229651 A1* | 9/2012 | Takizawa | 348/169 |
| 2012/0243738 A1* | 9/2012 | Sakata | 382/103 |
| 2013/0024873 A1* | 1/2013 | Hillier | 719/313 |
| 2013/0108175 A1* | 5/2013 | Ptucha | 382/199 |
| 2013/0127915 A1* | 5/2013 | Gilra | 345/660 |
| 2013/0155308 A1* | 6/2013 | Wu et al. | 348/333.05 |
| 2015/0040035 A1* | 2/2015 | Neelakant et al. | 715/753 |

* cited by examiner

APPLICATION OF FILTERS REQUIRING FACE DETECTION IN PICTURE EDITOR

PRIORY CLAIM

This application is a continuation-in-part of application Ser. No. 13/548,391, filed Jul. 13, 2012, which is hereby included by reference herein in its entirety.

FIELD OF THE DISCLOSURE

The present disclosure relates generally to an electronic device, and more particularly, to a method and apparatus for applying filters to facial images rendered on a display of the mobile device via a photo edit application.

BACKGROUND

Typical mobile communications devices, such as smart phones, tablets and the like, are configured for voice and data communications over networks, and to execute a variety of applications in such regard. These applications may include, but are not limited to, the following functions: phone, media player, mapping, calendar, email, instant messaging (IM), text messaging (e.g., for sending and receiving short message service (SMS)/multimedia message (MMS) messages), among others. Navigation between the various features and applications of handheld electronic devices is typically implemented via one or more graphical user interfaces (GUIs) having icon menus. Any feature, operation, command, function or application can be represented by an icon in the icon menu.

Such devices are further being provided with advanced technology cameras for taking pictures and videos, which may then be edited from memory, and communicated over networks using the various media transport described above. There are many commercially available photo editing applications that enable a user to modify stored images. In this regard, it is known to crop, rotate, and apply various filters to an image to enhance or advantageously alter its appearance. In the case of a facial image, a filtering process can be used to smooth the facial features and to provide a generally better looking final image.

Aspects of the present disclosure aim to provide a new methodology for applying filters to a facial image when the image is rotated or otherwise translated within a frame.

DETAILED DESCRIPTION OF THE DISCLOSURE

Figure 1:
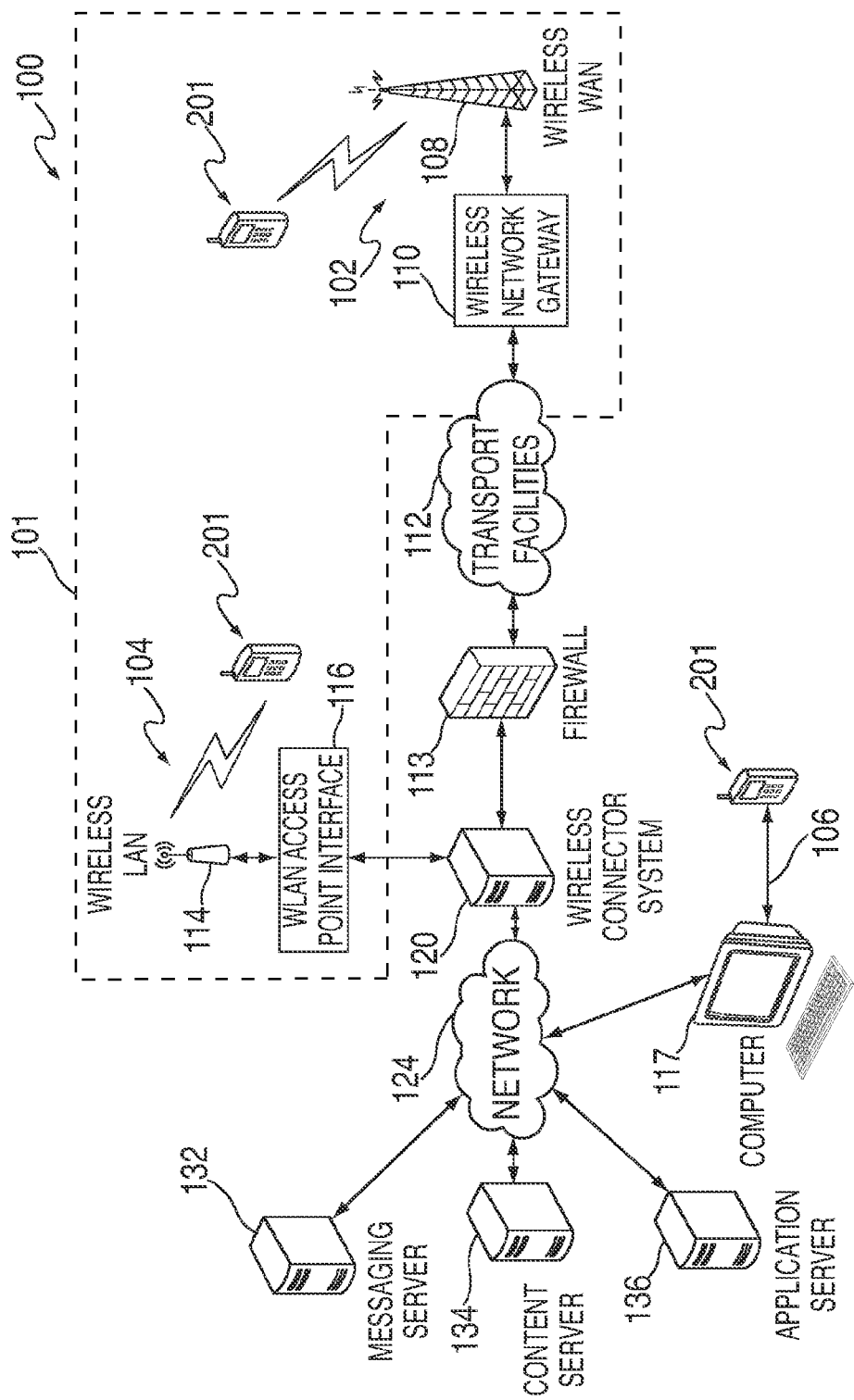
FIG. 1 is a block diagram illustrating a communication system including a mobile communication device to which example embodiments of the present disclosure can be applied.

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components have not been described in detail to avoid obscuring the disclosed embodiments. The description is not to be considered as limited to the scope of the embodiments shown and described herein.

The embodiments described herein generally relate to electronic devices, which may be portable or stationary. Examples of portable electronic devices include mobile (wireless) communication devices such as pagers, cellular phones, Global Positioning System (GPS) navigation devices and other satellite navigation devices, smartphones, wireless organizers, personal digital assistants and wireless-enabled notebook computers. At least some of these portable electronic devices may be handheld electronic devices. The portable electronic device may be a portable electronic device without wireless photograph album, digital camera and video recorder such as a camcorder. The portable electronic devices could have a touchscreen display, a mechanical keyboard in addition to a touchscreen display, or a conventional non-touchscreen display with a mechanical keyboard. These examples are intended to be non-limiting.

In accordance with an aspect of the disclosure, there is provided an electronic device and method of operation thereof, the electronic device comprising at least one processor communicatively coupled to a display and memory, the processor configured for filtering a facial image rendered on the display. In an illustrative embodiment, the at least one processor is configured to generate a boundary around the facial image, the boundary having 2-dimensional x and y coordinates relative to boundaries of the display; store the coordinates in memory; in response to at least one of a cropping and moving of the image, recalculate the coordinates to match a new transform setting; and apply an effect to the facial image based on the updated coordinates.

In order to facilitate an understanding of one possible environment for implementing illustrative embodiments of the disclosure, reference is made to FIG. 1, which depicts a block diagram of an exemplary communication system 100. The communication system 100 comprises a plurality of mobile communication devices 201 which may be networked within system 100. In this regard, several instances of mobile communication devices 201 are depicted in FIG. 1 employing different network connections within system 100. Mobile communication devices 201 are connected to a wireless network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network protocols: MOBITEX™ Radio Network, DATATAC™, GSM (Global System for Mobile Communication), GPRS (General Packet Radio System), TDMA (Time Division Multiple Access), CDMA (Code Division Multiple Access), CDPD (Cellular Digital Packet Data), IDEN™ (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or WIMAX™), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realized using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly as indicated by the dashed line if FIG. 1 via the transport facilities 112 if the access point 114 is a personal WI-FI™ network or WI-FI®™ hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a MICROSOFT EXCHANGE™, IBM LOTUS DOMINO™, or NOVELL GROUPWISE™ email server), and a content server 134 for providing content such as Internet content or content from an organization's internal servers, and application servers 136 for implementing server-based applications such as instant messaging (IM) applications to mobile communication devices 201.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device

201 over the WWAN 201 to the wireless connector system 120. The wireless connector system 120 then sends the data packets to the appropriate connection point such as the messaging server 132, content server 134 or application servers 136. Conversely, the wireless connector system 120 sends data packets received, for example, from the messaging server 132, content server 134 or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134 and application server 136.

The network 124 may comprise a private local area network, metropolitan area network, wide area network, the public Internet or combinations thereof and may include virtual networks constructed using any of these, alone, or in combination.

A mobile communication device 201 may alternatively connect to the wireless connector system 120 using a computer 117, such as desktop or notebook computer, via the network 124. A link 106 may be provided for exchanging information between the mobile communication device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, FIREWIRE™ (also known as an IEEE 1394 interface) connection, or other serial data connection, via respective ports or interfaces of the mobile communication device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IRDA™) connection, a short-range radio frequency (RF) connection such as one specified by IEEE.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or BLU-RAY™ Disc, and a solid state storage device (e.g., NAND flash or synchronous dynamic RAM (SDRAM)).

Figure 2:
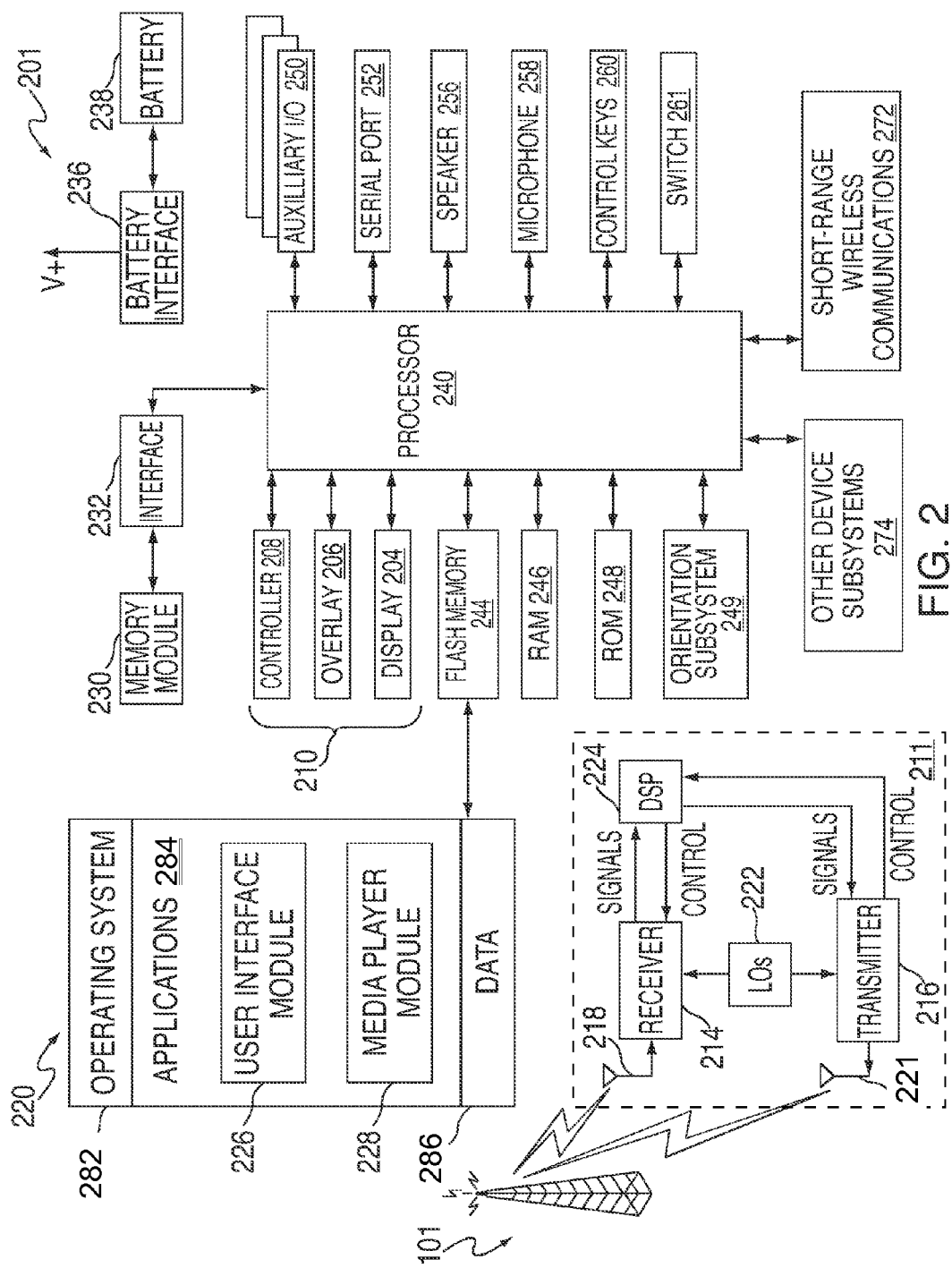
FIG. 2 is a block diagram illustrating a mobile communication device in accordance with one example embodiment of the present disclosure.

Reference is now made to FIG. 2, which illustrates a mobile communication device 201 in which example embodiments described in the present disclosure can be applied. The mobile communication device 201 is a two-way communication device having at least data and possibly also voice communication capabilities, and the capability to communicate with other computer systems, for example, via the Internet. Depending on the functionality provided by the mobile communication device 201, in various embodiments the device may be a data communication device, a multiple-mode communication device configured for both data and voice communication, a smartphone, a mobile telephone or a PDA (personal digital assistant) enabled for wireless communication, or a computer system with a wireless modem.

The mobile communication device 201 includes a controller comprising at least one processor 240 such as a microprocessor which controls the overall operation of the mobile communication device 201, and a wireless communication subsystem 211 for exchanging radio frequency signals with the wireless network 101. The processor 240 interacts with the communication subsystem 211 which performs communication functions. The processor 240 interacts with additional device subsystems including a display (screen) 204, such as a liquid crystal display (LCD) screen, with a touch-sensitive input surface or overlay 206 connected to an electronic controller 208 that together make up a touchscreen display 210. The touch-sensitive overlay 206 and the electronic controller 208 provide a touch-sensitive input device and the processor 240 interacts with the touch-sensitive overlay 206 via the electronic controller 208.

The processor 240 interacts with additional device subsystems including flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, control keys 260, switch 261, short-range communication subsystem 272, and other device subsystems generally designated as 274. Some of the subsystems shown in FIG. 2 perform communication-related functions, whereas other subsystems may provide "resident" or on-device functions.

The communication subsystem 211 includes a receiver 214, a transmitter 216, and associated components, such as one or more antenna elements 218 and 221, local oscillators (LOs) 222, and a processing module such as a digital signal processor (DSP) 224. The antenna elements 218 and 221 may be embedded or internal to the mobile communication device 201 and a single antenna may be shared by both receiver and transmitter, as is known in the art. As will be apparent to those skilled in the field of communication, the particular design of the wireless communication subsystem 211 depends on the wireless network 101 in which mobile communication device 201 is intended to operate.

The mobile communication device 201 may communicate with any one of a plurality of fixed transceiver base stations 108 of the wireless network 101 within its geographic coverage area. The mobile communication device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 101 via the antenna 221. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 220 stored in memory such as persistent memory, for example, in the flash memory 244. As illustrated in FIG. 2, the software modules 220 comprise operating system software 282, software applications 284 comprising a user interface module 226, and a media player module 228 for providing a media player application. The user interface module 226 renders and displays the GUI of the device 201 in accordance with instructions of the operating system 282 and applications 284 (as applicable).

The modules 226, 228 may, among other things, each be implemented through stand-alone software applications, or combined together in one or more of the operating system 282 and applications 284. In some example embodiments, the functions performed by each of the above identified modules 226, 228 may be realized as a plurality of independent elements, rather than a single integrated element, and any one or more of these elements may be implemented as parts of other software applications.

Those skilled in the art will appreciate that the software modules 220 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 284 may include a range of applications, including, for example, an address book application, a messaging application (i.e., SMS, MMS), a photo editing suite/drivers for a camera/video recorder, a calendar application, and/or a notepad application. In some embodiments, the software applications 284 include an email message application, a push content viewing application, a voice communication (i.e. telephony) application, a map application, and a media player application. Each of the software applications 284 may include layout information defining the placement of particular fields and graphic elements (e.g. text fields, input fields, icons, etc.) in the user interface (i.e. the display device 204) according to the application. As described further below with particular reference to illustrative embodiments, the applications (or modules) are so configured to enable enhanced messaging functionality from either an in-call or call log UI. Such programming can be implemented by those skilled in the art based on the teachings herein.

In some embodiments, the auxiliary input/output (I/O) subsystems 250 may comprise an external communication link or interface, for example, an Ethernet connection. The mobile communication device 201 may comprise other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may comprise a vibrator for providing vibratory notifications in response to various events on the mobile communication device 201 such as receipt of an electronic communication or incoming phone call, or for other purposes such as haptic feedback (touch feedback).

In some embodiments, the mobile communication device 201 also includes a removable memory card 230 (typically comprising flash memory) and a memory card interface 232. Network access typically associated with a subscriber or user of the mobile communication device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile communication device 201 in order to operate in conjunction with the wireless network 101.

The mobile communication device 201 stores data 286 in an erasable persistent memory, which in one example embodiment is the flash memory 244. In various embodiments, the data 286 includes service data comprising information required by the mobile communication device 201 to establish and maintain communication with the wireless network 101. The data 286 may also include user application data such as email messages, address book and contact information, calendar and schedule information, notepad documents, image files, and other commonly stored user information stored on the mobile communication device 201 by its user, and other data. The data 286 stored in the persistent memory (e.g. flash memory 244) of the mobile communication device 201 may be organized, at least partially, into a number of databases each containing data items of the same data type or associated with the same application. For example, email messages, contact records, and task items may be stored in individual databases within the device memory.

The serial data port 252 may be used for synchronization with a user's host computer system (not shown). The serial data port 252 enables a user to set preferences through an external device or software application and extends the capabilities of the mobile communication device 201 by providing for information or software downloads to the mobile communication device 201 other than through the wireless network 101. The alternate download path may, for example, be used to load an encryption key onto the mobile communication device 201 through a direct, reliable and trusted connection to thereby provide secure device communication.

In some embodiments, the mobile communication device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile communication device 201 to the host computer system via a USB cable or Bluetooth® connection, traffic that was destined for the wireless network 101 is automatically routed to the mobile communication device 201 using the USB cable or Bluetooth® connection. Similarly, any traffic destined for the wireless network 101 is automatically sent over the USB cable Bluetooth® connection to the host computer system for processing.

The mobile communication device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 272 is an additional optional component which provides for communication between the mobile communication device 201 and different systems or devices, which need not necessarily be similar devices. For example, the subsystem 272 may include an infrared device and associated circuits and components, or a wireless bus protocol compliant communication mechanism such as a BLUETOOTH® communication module to provide for communication with similarly-enabled systems and devices.

A predetermined set of applications that control basic device operations, including data and possibly voice communication applications will normally be installed on the mobile communication device 201 during or after manufacture. Additional applications and/or upgrades to the operating system 221 or software applications 224 may also be loaded onto the mobile communication device 201 through the wireless network 101, the auxiliary I/O subsystem 250, the serial port 252, the short-range communication subsystem 272, or other suitable subsystem 274 other wireless communication interfaces. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 204. A user of the mobile communication device 201 may also compose data items, such as email messages, for example, using the touch-sensitive overlay 206 in conjunction with the display device 204 and possibly the control buttons 260 and/or the auxiliary I/O subsystems 250. These composed items may be transmitted through the communication subsystem 211 over the wireless network 101.

In the voice communication mode, the mobile communication device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile communication device 201. Although voice or audio signal output is typically accomplished primarily through the speaker 256, the display device 204 may also be used to provide an indication of the identity of a calling party, duration of a voice call, or other voice call related information.

The touchscreen display 210 can be any suitable touchscreen display such as a capacitive touchscreen display. A capacitive touchscreen display 210 includes the display device 204 and the touch-sensitive overlay 206, in the form of a capacitive touch-sensitive overlay 206. It will be appreciated that the capacitive touch-sensitive overlay 206 includes a number of layers in a stack and is fixed to the display device 204 via a suitable optically clear adhesive. The layers can include, for example a substrate fixed to the display device 204 (e.g. LCD display) by a suitable adhesive, a ground shield layer, a barrier layer, a pair of capacitive touch sensor layers separated by a substrate or other barrier layer, and a cover layer fixed to the second capacitive touch sensor layer by a suitable adhesive. The capacitive touch sensor layers can be any suitable material such as patterned indium tin oxide (ITO).

Each of the touch sensor layers comprises an electrode layer each having a number of spaced apart transparent electrodes. The electrodes may be a patterned vapour-deposited ITO layer or ITO elements. The electrodes may be, for example, arranged in an array of spaced apart rows and columns. The touch sensor layers/electrode layers are each associated with a coordinate (e.g., x or y) in a coordinate system used to map locations on the touchscreen display 210, for example, in Cartesian coordinates (e.g., x and y-axis coordinates). The intersection of the rows and columns of the electrodes may represent pixel elements defined in terms of an (x, y) location value which can form the basis for the coordinate system. Each of the touch sensor layers provide a signal to the controller 208 which represent the respective x and y coordinates of the touchscreen display 210. That is, x locations are provided by a signal generated by one of the touch sensor layers and y locations are provided by a signal generated by the other of the touch sensor layers.

The electrodes in the touch sensor layers/electrode layers respond to changes in the electric field caused by conductive objects in the proximity of the electrodes. When a conductive object is near or contacts the touch-sensitive overlay 206, the object draws away some of the charge of the electrodes and reduces its capacitance. The controller 208 receives signals from the touch sensor layers of the touch-sensitive overlay 206, detects touch events by determining changes in capacitance which exceed a predetermined threshold, and determines the centroid of a contact area defined by electrodes having a change in capacitance which exceeds the predetermined threshold, typically in x, y (Cartesian) coordinates.

The controller 208 sends the centroid of the contact area to the processor 240 of the device 201 as the location of the touch event detected by the touchscreen display 210. Depending on the touch-sensitive overlay 206 and/or configuration of the touchscreen display 210, the change in capacitance which results from the presence of a conductive object near the touch-sensitive overlay 206 but not contact the touch-sensitive overlay 206, may exceed the predetermined threshold in which case the corresponding electrode would be included in the contact area. The detection of the presence of a conductive object such as a user's finger or a conductive stylus is sometimes referred to as finger presence/stylus presence.

It will be appreciated that other attributes of a touch event on the touchscreen display 210 can be determined For example, the size and the shape (or profile) of the touch event on the touchscreen display 210 can be determined in addition to the location based on the signals received at the controller 208 from the touch sensor layers. For example, the touchscreen display 210 may be used to create a pixel image of the contact area created by a touch event. The pixel image is defined by the pixel elements represented by the intersection of electrodes in the touch sensor layers/electrode layers. The pixel image may be used, for example, to determine a shape or profile of the contact area.

The centroid of the contact area is calculated by the controller 208 based on raw location and magnitude (e.g., capacitance) data obtained from the contact area. The centroid is defined in Cartesian coordinates by the value ($X_c$, $Y_c$). The centroid of the contact area is the weighted averaged of the pixels in the contact area and represents the central coordinate of the contact area. By way of example, the centroid may be found using the following equations:

$$X_c = \frac{\sum_{i=1}^{n} Z_i * x_i}{\sum_{i=1}^{n} Z_i}, Y_c = \frac{\sum_{i=1}^{n} Z_i * y_i}{\sum_{i=1}^{n} Z_i}. \quad (1)$$

In these equations, $X_c$ represents the x-coordinate of the centroid of the contact area, $Y_c$ represents the y-coordinate of the centroid of the contact area, x represents the x-coordinate of each pixel in the contact area, y represents the y-coordinate of each pixel in the contact area, Z represents the magnitude (capacitance value or resistance) at each pixel in the contact area, the index i represents the electrodes in the contact area and n represents the number of electrodes in the contact area. Other methods of calculating the centroid will be understood to persons skilled in the art.

The controller 208 of the touchscreen display 210 is typically connected using both interpret and serial interface ports to the processor 240. In this way, an interrupt signal which indicates a touch event has been detected, the centroid of the contact area, as well as raw data regarding the location and magnitude of the activated electrodes in the contact area are passed to the processor 240. However, in other example embodiments only an interrupt signal which indicates a touch event has been detected and the centroid of the contact area are passed to the processor 240. In embodiments where the raw data is passed to the processor 240, the detection of a touch event (i.e., the application of an external force to the touch-sensitive overlay 206) and/or the determination of the centroid of the contact area may be performed by the processor 240 of the device 201 rather than the controller 208 of the touchscreen display 210.

In other embodiments, the touchscreen display 210 may be a display device, such as an LCD screen, having the touch-sensitive input surface (overlay) 206 integrated therein. One example of such a touchscreen is described in commonly owned U.S. patent publication No. 2004/0155991, published Aug. 12, 2004 (also identified as U.S. patent application Ser. No. 10/717,877, filed Nov. 20, 2003) which is incorporated herein by reference.

While a specific embodiment of the touchscreen display 210 has been described, any suitable type of touchscreen in the handheld electronic device of the present disclosure including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the handheld electronic device and its particular application and demands.

The mobile communication device 201 also comprises a device orientation subsystem 249 comprising at least one orientation sensor which is connected to the processor 240 and which is controlled by one or a combination of a monitoring circuit and operating software. The device orientation subsystem 249 may comprise two or more orientation sensors or an orientation sensor and an electronic compass. The device orientation subsystem 249 detects the orientation of the mobile communication device 201 or detects information which the orientation of the mobile communication device 201 can be determined, such as acceleration using an accelerometer. In other embodiments, an orientation sensor other than an accelerometer could be used, such as a gravity sensor, a gyroscope, a tilt sensor, an electronic compass, or other suitable sensor, or combinations thereof.

As will be appreciated by persons skilled in the art, an accelerometer is a sensor which converts acceleration from motion (e.g. movement of the mobile communication device 201 or a portion thereof due to the strike force) and gravity which are detected by a sensing element into an electrical signal (producing a corresponding change in output) and is available in one, two or three axis configurations. Accelerometers may produce digital or analog output signals depending on the type of accelerometer. Generally, two types of outputs are available depending on whether an analog or digital accelerometer used: (1) an analog output requiring buffering and analog-to-digital (A/D) conversion; and (2) a digital output which is typically available in an industry standard interface such as an SPI (Serial Peripheral Interface) or I2C (Inter-Integrated Circuit) interface. The output of an accelerometer is typically measured in terms of the gravitational acceleration constant at the Earth's surface, denoted g, which is approximately 9.81 m/s$^2$ (32.2 ft/s$^2$) as the standard average. The accelerometer may be of almost any type including, but not limited to, a capacitive, piezo-electric, piezo-resistive, or gas-based accelerometer. The range of accelerometers vary up to the thousands of g's, however for portable electronic devices "low-g" accelerometers may be used. Example low-g accelerometers which may be used are MEMS digital accelerometers from Analog Devices, Inc., Freescale Semiconductor, Inc., and STMicroelectronics N.V. of Geneva, Switzerland.

Figure 3:
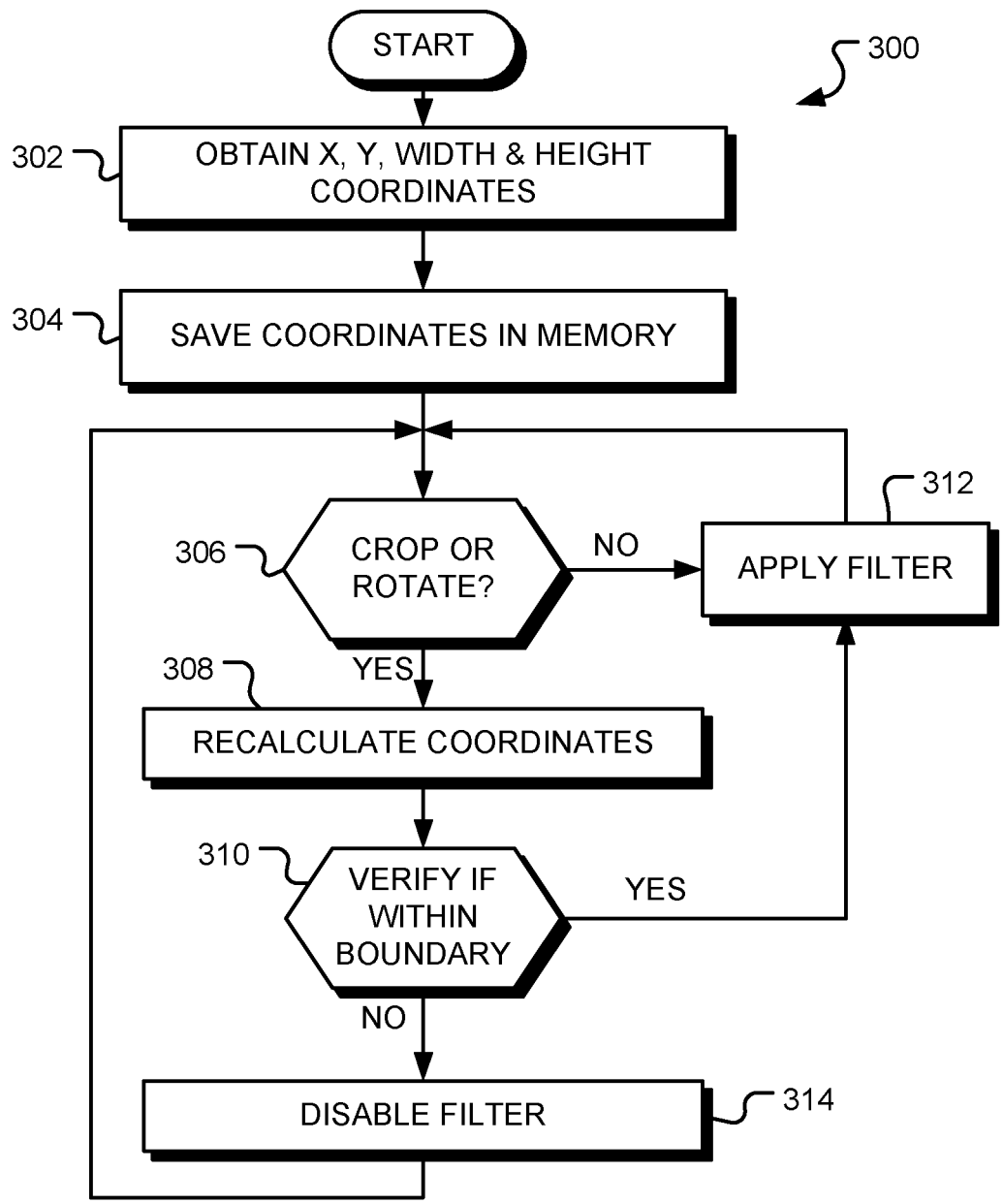
FIG. 3 is a flow diagram of an exemplary process in accordance with the disclosure.

Referring now to FIG. 3, there is depicted a flow diagram for implementing a process 300 in accordance with aspects of the disclosure. In particular, the process 300 comprises the steps of applying a face detection sub-process 302 to obtain coordinates of a facial image (x, y, width, height) corresponding to rectangles covering the face and eyes thereof. It will be appreciated by those skilled in the art, that the rectangle may cover only one of the two eyes of the subject, or those of multiple faces. In step 304, the coordinates are saved in memory of the device as described in the foregoing. At step 306, if a user crops and or rotates the image, the coordinates are recalculated to match the newly edited image at block 308. If the image is not transformed by cropping or rotation, as depicted by the negative branch from decision block 306, the user may apply a filter effect to the image at block 312. If upon applying a crop and/or rotation to the image, the coordinates are no longer disposed within the boundary of the display, as depicted by the negative branch from decision block 310, then the filters associated with the face detection process are disabled at block 314 and flow returns to decision block 306. The implementation of saving and recalculating positions of the facial elements enables filter effects that require face detection to be correctly applied to images when face detection would otherwise fail, such as, for example, when cropping parts of a face away or otherwise significantly altering the contrast/brightness/saturation of the image.

Figure 4:
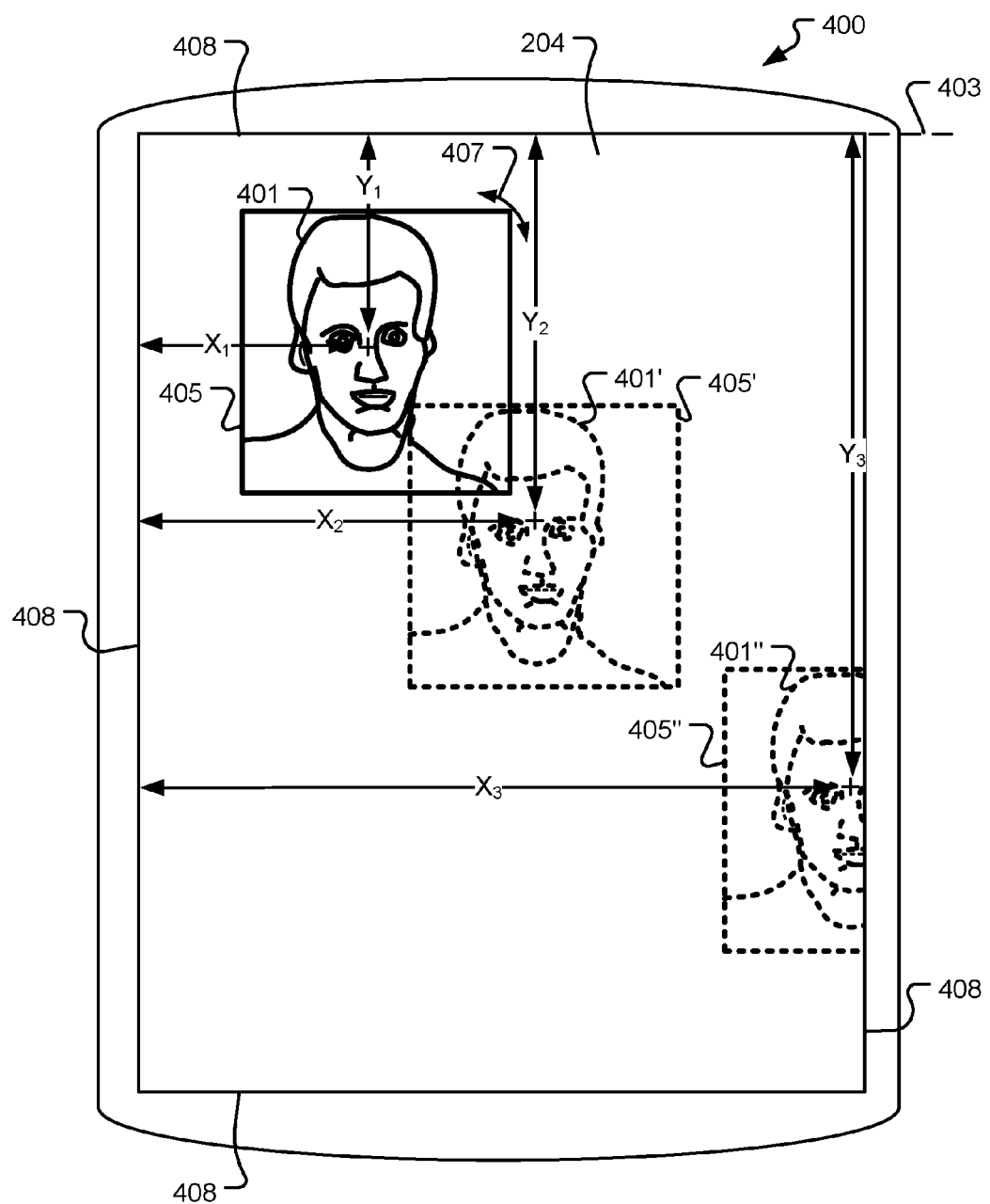
FIG. 4 is a schematic of an electronic device having a display with facial images rendered thereon depicting an exemplary process for filtering the same in accordance with aspects of the disclosure.

Referring to FIG. 4, there is depicted an illustrative application of applying filters to a facial image in accordance with aspects of the disclosure. An electronic device 400 includes a display 204, with display boundary 408, which renders a first image that includes within the first image a facial image 401 in a first position. The facial image resides in an image boundary represented by reference numeral 405 and having coordinates $x_1$, $y_1$ relative to datum 403, together with a width and a height. When a user translates the image 401 to a new position, a new image 401' is generated as shown in the figure. In order to avoid having to recalculate the new position of the image, the same translation is applied to the frame coordinates to obtain updated coordinates $x_2$, $y_2$ of image fame 405'. The coordinates $x_2$, $y_2$ are stored in memory and when an effect is applied to the image, the processor retrieves the new coordinates and implements the desired effect. The new coordinates may be calculated in response to a horizontal/vertical translation relative to datum 403, or responsive to rotating the image as represented by reference numeral 407. If the user moves/translates/rotates the image 401 to a location partially outside of display boundary 408 as represented by reference numeral 401", the frame coordinates are updated again to obtain updated coordinates $x_3$, $y_3$ of image frame 405", and an effect filter may be applied to the partial image, even though the partial image may not have been found by a face detection application. If the user moves/translates/rotates the image 401 to a location outside of display boundary 408, then the photo edit application disables the filters and a new filter process may be initiated.

An aspect of the present disclosure relates to a method of filtering a facial image, in which a first image is rendered on a display of an electronic device within a boundary of the display, the facial image is detected within the first image and an image boundary is generated around the facial image, the image boundary defined by frame coordinates relative to the boundary of the display. The frame coordinates are stored in a memory of the electronic device. When the first image is transformed, by cropping, moving or rotating, or a combination thereof, the frame coordinates are retrieved from the memory and the frame coordinates are updated to provide updated frame coordinates that match a transformed facial image within the transformed first image. A filter effect is applied to the transformed facial image if the updated frame coordinates are determined to be disposed within the boundary of the display, however, the filter effect is disabled if the updated frame coordinates are disposed outside of the boundary of the display.

The updated frame coordinates may be stored in the memory for use if an additional transformation is applied. In addition, the original frame coordinates may be retained be enable an 'undo' action to the performed to recover the original image and original frame.

The present disclosure recognizes that storing, retrieving, and updated frame coordinates is more efficient than detecting facial images in the transformed image, and further recognizes that filtering facial images outside of the boundary may not be required.

Still further, the present disclosure recognizes that when a facial image is only partially within the boundary of the displayed image, it may not be detected by facial detection software, yet it may be desirable to apply a filter to the facial image. The filter may be applied to the complete facial image or to the partial facial image within the boundary.

In one embodiment, the method includes: determining if the updated frame coordinates of the image boundary are disposed only partially within the boundary of the display, applying a filter effect to a portion of the transformed facial image disposed within the boundary of the display to provide a filtered partial image, and rendering the filtered partial image on the display of the electronic device. For some filtering effects, such as color balance for example, it may be preferable to consider only the partial image.

In a further embodiment the method includes: determining if the updated frame coordinates of the image boundary are disposed only partially within the boundary of the display, applying a filter effect to the transformed facial image disposed within the transformed frame to provide a filtered facial image, and rendering only the portion of the filtered facial image disposed within the boundary of the display on the display of the electronic device. For some filtering effects, such as 'red eye reduction' for example, it may be preferable to apply the filter to the complete image.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of filtering a facial image, comprising:
rendering a first image on a display of an electronic device within a boundary of the display;
detecting the facial image within the first image;
rendering an image boundary around the facial image on the display;
calculating frame coordinates of the image relative to the boundary of the display;
storing the frame coordinates in a memory of the electronic device;
in response to transformation of the first image, the transformation comprising at least one of a cropping and moving of the first image, retrieving the frame coordinates from the memory and applying the transformation to the frame coordinates to obtain updated frame coordinates relative to the boundary of the display, wherein the updated frame coordinates match a transformed facial image within the transformed first image without detecting the facial image in the transformed first image;
determining if the updated frame coordinates of the image boundary are disposed within the boundary of the display;
in response to determining that the updated frame coordinates are disposed at least partially within the boundary of the display
applying a filter effect to the transformed facial image to provide a filtered facial
image in response to determining that the updated frame coordinates are disposed at least partially within the boundary of the display, and
rendering the filtered facial image on the display of the electronic device, wherein if the updated frame coordinates are disposed only partially within the boundary of the display only a portion of the filtered facial image is rendered on the display, wherein the portion of the filtered facial image is disposed within the boundary of the display; and
disabling the filter effect in response to determining that the updated frame coordinates are disposed outside of the boundary of the display.

2. The method of claim 1, further comprising:
retrieving the updated frame coordinates from a memory of the electronic device;
applying the filter effect to the image within the frame; and
rendering a new facial image having the filter effect applied thereto.

3. The method of claim 1, where moving the first image comprises one or more of rotating the first image and translating the first image.

4. The method of claim 1, where the first image comprises a photograph that includes one or more facial images.

5. The method of claim 1, where detecting the facial image within the first image comprises a processor of the electronic device executing a face-detection process, wherein the method further comprises rendering an updated image boundary on the display utilizing the updated frame coordinates.

6. The method of claim 1, where the image boundary comprises a rectangle and where the frame coordinates comprise a height, a width and x and y coordinates relative to the boundary of the display.

7. The method of claim 1, further comprising storing the updated frame coordinates in the memory of the electronic device.

8. The method of claim 1, wherein
applying the filter effect comprises applying the filter effect to a portion of the transformed facial image disposed within the boundary of the display to provide a filtered partial image in response to determining that the updated frame coordinates are disposed at least partially within the boundary of the display, and wherein rendering the filtered facial image comprises rendering the filtered partial image on the display of the electronic device.

9. An electronic device, comprising at least one processor communicatively coupled to a display and memory, the processor configured for filtering a facial image rendered on the display by:
rendering a first image on the display of the electronic device within a boundary of the display;
detecting the facial image within the first image;
rendering an image boundary around the facial image on the display;
calculating frame coordinates of the image boundary relative to a boundary of the display;
storing the frame coordinates in memory;
in response to a transform of the first image, the transform comprising at least one of a cropping and moving of the first image, retrieving the frame coordinates from the memory and applying the transformation to the frame coordinates to obtain updated frame coordinates relative to the boundary of the display without detecting the facial image in the transformed first image, wherein the updated frame coordinates match a transformed facial image within the transformed first image;
determining if the updated frame coordinates of the image boundary are disposed within the boundary of the display;
in response to determining that the updated frame coordinates are disposed at least partially within the boundary of the display
applying a filter effect to the transformed facial image to provide a filtered facial image in response to determining that the updated frame coordinates are disposed at least partially within the boundary of the display, and
rendering the filtered facial image on the display of the electronic device, wherein if the updated frame coordinates are disposed only partially within the boundary of the display only a portion of the filtered facial image is rendered on the display, wherein the portion of the filtered facial image is disposed within the boundary of the display; and
disabling the filter effect in response to determining that the updated frame coordinates are disposed outside of the boundary of the display.

10. The electronic device of claim 9, wherein the processor of the electronic device is further configured to render a new facial image having the filter effect applied thereto.

11. The electronic device of claim 9, wherein
applying the filter effect comprises applying the filter effect to a portion of the transformed facial image disposed within the boundary of the display to provide a filtered partial image in response to determining that the updated frame coordinates are disposed at least partially within the boundary of the display, and wherein rendering the filtered facial image comprises rendering the filtered partial image on the display of the electronic device.

12. The electronic device of claim 9, where the electronic device comprises a mobile communication device.

13. The electronic device of claim 9, where the first image comprises a photograph that includes one or more facial images.

14. A non-transitory computer readable medium containing instructions that, when executed on a processor of an electronic device, perform a method of picture-editing comprising:
rendering a first image on a display of an electronic device within a boundary of the display;
detecting a facial image within the first image;
rendering an image boundary around the facial image on the display;
calculating frame coordinates of the image boundary relative to the boundary of the display;
storing the frame coordinates in a memory of the electronic device;
in response to transformation of the first image, retrieving the frame coordinates from the memory and applying the transformation to the frame coordinates to obtain updated frame coordinates relative to the boundary of the display, wherein the updated frame coordinate match a transformed facial image within the transformed first image without detecting the facial image in the transformed first image;
determining if the updated frame coordinates of the image boundary are disposed within the boundary of the display;
in response to determining that the updated frame coordinates are disposed at least partially within the boundary of the display
applying a filter effect to the transformed facial image to provide a filtered facial image in response to determining that the updated frame coordinates are disposed at least partially within the boundary of the display, and
rendering the filtered facial image on the display of the electronic device, wherein if the updated frame coordinates are disposed only partially within the boundary of the display only a portion of the filtered facial image is rendered on the display, wherein the portion of the filtered facial image is disposed within the boundary of the display; and
disabling the filter effect in response to determining that the updated frame coordinates are disposed outside of the boundary of the display.

15. The non-transitory computer readable medium of claim 14 where, in the method performed upon execution of the instructions stored on the non-transitory computer readable medium, transformation of the first image comprises at least one of moving the first image with respect to the display and cropping the first image.

16. The non-transitory computer readable medium of claim 14, wherein
applying the filter effect comprises applying the filter effect to a portion of the transformed facial image disposed within the boundary of the display to provide a filtered partial image in response to determining that the updated frame coordinates are disposed at least partially within the boundary of the display, and wherein rendering the filtered facial image comprises rendering the filtered partial image on the display of the electronic device.

* * * * *